Figure 1:
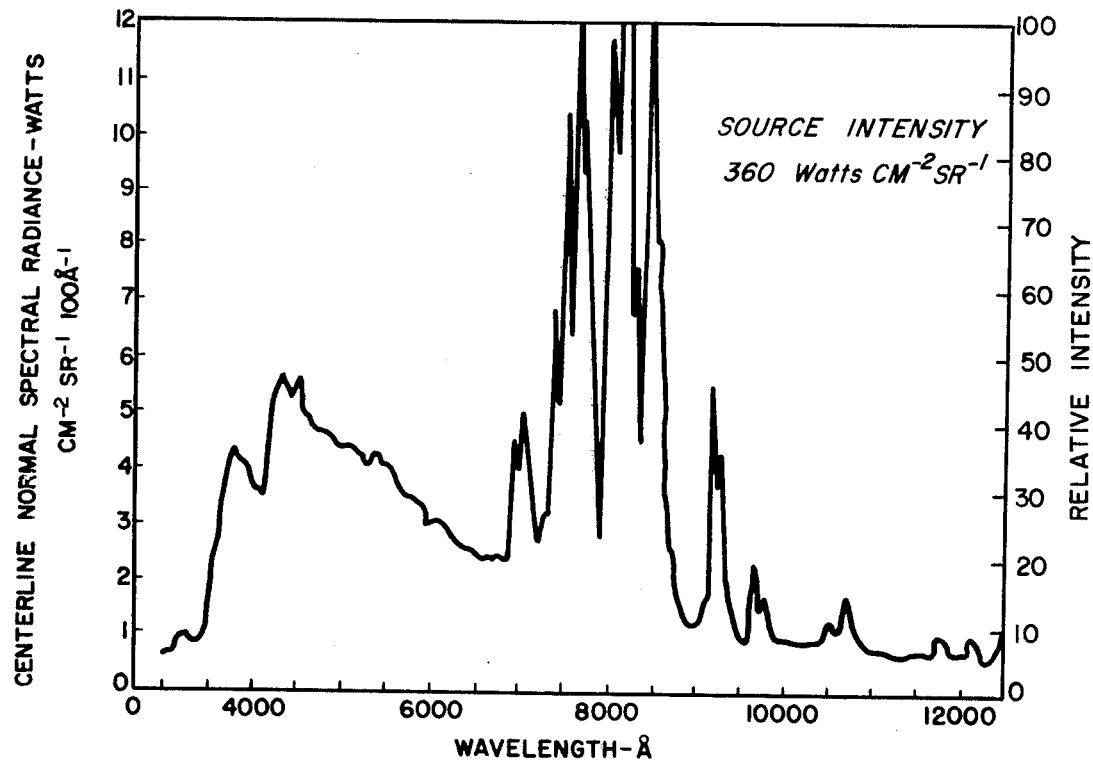

United States Patent [19]

Smith et al.

[11] 3,935,330

[45] Jan. 27, 1976

[54] TWO-STEP COATING PROCESS

[75] Inventors: Oliver W. Smith, South Charleston; Charles H. Carder, Charleston; David J. Trecker, South Charleston, all of W. Va.

[73] Assignee: Union Carbide Corporation, New York, N.Y.

[22] Filed: Dec. 8, 1971

[21] Appl. No.: 205,855

[52] U.S. Cl. .................. 427/41; 96/115 P; 427/53; 427/54; 204/159.15; 204/159.19
[51] Int. Cl. .......................... B44d 1/50; C09d 3/58
[58] Field of Search .... 117/93.31, 161 ZB, 161 LN, 117/161 UC, 161 UB, 161 UT, 119, DIG. 3; 204/159.15, 159.19; 260/851, 856, 837; 96/115 P

[56] References Cited
UNITED STATES PATENTS

| | | | |
|---|---|---|---|
| 2,545,450 | 3/1951 | Dalton et al. ..................... | 117/93.31 |
| 3,137,674 | 6/1964 | Marans et al. ................. | 117/93.31 X |
| 3,450,613 | 6/1969 | Steinberg ....................... | 204/159.15 |
| 3,520,714 | 7/1970 | Miller .......................... | 117/93.31 X |
| 3,535,148 | 10/1970 | Ravve ............................ | 117/93.31 |
| 3,551,311 | 12/1970 | Nass et al. ................... | 117/93.31 X |
| 3,558,387 | 1/1971 | Bassemir et al. ................ | 260/851 X |
| 3,625,744 | 12/1971 | Juna et al. ....................... | 117/93.31 |
| 3,669,796 | 6/1972 | Hall et al. ...................... | 117/93.31 X |
| 3,676,192 | 7/1972 | Hahn ............................. | 117/93.31 |
| 3,740,287 | 6/1973 | Eichhorn ..................... | 117/93.31 X |
| 3,772,062 | 11/1973 | Shur et al. .................... | 117/161 UC |
| 3,776,729 | 12/1973 | Levy et al. ................. | 204/159.15 X |

FOREIGN PATENTS OR APPLICATIONS 246,320   6/1969   U.S.S.R. .......................... 96/115 P

Primary Examiner—Harry J. Gwinnell
Attorney, Agent, or Firm—Francis M. Fazio

[57] ABSTRACT

Coating compositions are cured by initially treating them for a brief period with ionizing or non-ionizing radiation whereby they are partially cured and then completing the cure by a thermal treatment. This two-step process decreases the amount of volatiles escaping into the atmosphere and it also permits the use of compounds not useful in the past and allows significant improvement in film properties such as adhesion to metal. The initial radiation cure can be with electron beam, ultraviolet mercury lamp, plasma arc or other radiation means; the thermal cure is carried out by any heat means.

9 Claims, 4 Drawing Figures

INVENTORS
OLIVER W. SMITH
CHARLES H. CARDER
DAVID J. TRECKER

TWO-STEP COATING PROCESS

BACKGROUND OF THE INVENTION

The coating industry is faced with the problem of cutting down on volatile emissions with state and federal regulations being enacted to control the effluents allowed to escape into the atmosphere. This has prompted considerable coating reformulation. One of the routes taken has been the attempt to replace all of the volatile solvents in a coating composition with reactive diluents that become a part of the final coating. These compositions have become known in the art as 100 per cent reactive coatings. Such coatings are often cured by free-radical polymerization on the coated substrate; they can also be cured, in many instances, by irradiation with ionizing or non-ionizing energy.

In the past, many difficulties have been observed, in producing radiation cured high solids coatings having good hardness and toughness together with satisfactory adhesion by irradiation procedures.

SUMMARY OF THE INVENTION

It has now been found that many of the problems encountered in the past can be circumvented by the use of a two step process. It has also been found that the process of this invention can be used to produce satisfactory coatings with materials that have not in the past been capable of producing satisfactory coatings.

In the process of the instant invention the coating composition is initially treated for a brief period to a preliminary cure by exposure to ionizing or non-ionizing radiation. This partially cured coating is then completely cured by a thermal curing step. The radiation, as indicated, can be ionizing or non-ionizing. The ionizing radiation source can be any of the conventional electron beam or electron generating sources, as will be discussed hereafter. The non-ionizing radiation source can be mercury arcs, xenon arcs, swirl-flow plasma arcs, or any other source of ultraviolet and visible light radiation. The thermal curing step can be carried out in a conventional heating oven employing any suitable means for heat generation.

DESCRIPTION OF THE INVENTION

One of the major problems encountered in the past has been the volatilization of the volatile reactants or unreactive components present in the coating composition as the coating is cured by thermal curing means. This has led to air pollution problems and in some instances has resulted in deficiencies in the final coating itself. One of the problems associated with the radiation curing procedure has been the inability to prepare low viscosity coatings which cure to films having desirable chemical and physical properties. Both of these problems are resolved by use of the two step coating process of this invention.

STEP 1

The first step of the instant invention involves irradiation of the coating composition to convert the volatile components in the coating composition to a nonvolatile stage by exposure of the composition to ionizing or non-ionizing radiation. This can be and is accomplished to a sufficient degree regardless of whether or not a pigment is present. Subsequent thermal treatment then further cures or crosslinks the partially cured coating and completes the curing process. It has been known that exposure to ionizing or non-ionizing radiation alone, without the subsequent heating step, often results in poor adhesion of the coating to the substrate (particularly the metal substrates), impractically long exposure times, and poor physical properties. It was also known that the use of the heating step alone results in the evaporation of large amounts of the reactive solvents before they have had an opportunity to react. The combination of the two steps, radiation plus thermal, to treat the coatings in the order indicated, circumvents these problems and permits the use of combinations of thermosetting additives, (which contribute greatly to coating qualities) and reactive vinyl monomers in the same coating system.

Among the ionizing radiation means available for use in the first step are the particulate and non-particulate radiation types. Particulate radiation is that which can be generated from electron accelerators such as the Van de Graaff, resonance transformers, linear accelerators, insulated core transformers, radioactive elements such as cobalt 60, strontium 90, etc. As a suitable source of non-particle ionizing radiation, one can use any source which emits radiation in the range of from about $10^{-3}$ Angstrom, to about 2000 Angstroms, preferably from about $5 \times 10^{-3}$ Angstrom to about 1 Angstrom. Suitable sources are vacuum ultraviolet lamps, such as xenon or krypton arcs, and radioactive elements such as cesium-137, strontium-90, and cobalt-60. The nuclear reactors are also known to be a useful source of radiation.

As is known, irradiation of a polymer with a Van de Graaff accelerator results in rapid cure, often in a matter of seconds at high megarad dosages. This is to be compared to irradiation periods of hours when light from a mercury lamp is the source of energy.

The ionizing radiation dosage necessary to effect the preliminary cure will vary depending upon the particular polymer that is undergoing radiation, the extent of curing desired, the number of curable sites available and the molecular weight of the starting polymer. The total dosage will vary from about $10^3$ rads to $10^8$ rads, preferably from $5 \times 10^3$ rads to $10^7$ rads. A rad is 100 ergs of ionizing energy absorbed per gram of material being irradiated.

As a suitable source of non-ionizing radiation, one can use any source which emits radiation of from about 2000 Angstroms to about 8000 Angstroms, preferably from about 2500 Angstroms to about 4500 Angstroms. Suitable sources are mercury arcs, carbon arcs, tungsten filament lamps, xenon arcs, krypton arcs, sunlamps, lasers, and the like. All of these devices and sources are well known in the art and those familiar with the technology are fully aware of the manner in which the radiation is generated and the precautions to be exercised in its use.

Particularly efficient sources of non-ionizing light radiation for this invention are the ultraviolet mercury lamps and the swirl-flow plasma arc radiation arcs as described in U.S. Pat. No. 3,364,387. The apparatus or equipment necessary for generating the non-ionizing light radiation is not the subject of this invention and any source or apparatus capable of generating ultra violet and visible light radiation can be used. The plasma arc emits non-ionizing high intensity predominantly continuum light radiation containing ultraviolet, visible and infrared light radiation that can be used to polymerize monomers and to crosslink polymer compositions in the initial step of the process of this invention. By means of proper light filters, one can selectively screen out a portion of the light radiation emitted permitting only that wavelength portion desired to reach the material that is being treated. The mercury lamps are known to emit ultraviolet light as the major light emission.

The term "non-ionizing high intensity predominantly continuum light radiation" means continuum radiation with a source intensity of at least 350 watts per square centimeter steradian when integrated throughout the entire spectral range of said continuum light radiation (about 1,000 kilowatts per square foot of source projected area) having only a minor part of the energy in peaks of bandwidths less than 100 Angstrom units, with a positive amount up to about 30 per cent of the light radiated having wavelengths shorter than 4,000 Angstrom units and at least about 70 per cent but less than all of the light energy radiated having wavelengths longer than 4,000 Angstrom units. This type of non-ionizing high intensity predominantly continuum light radiation is illustrated by the curves shown in FIGS. 1 to 3. These curves illustrate the non-ionizing high intensity predominantly continuum nature of the light radiation over the range of source intensity of from about 350 watts per square centimeter steradian to about 5,000 watts per square centimeter steradian. As is evident from the curves of FIGS. 1 to 3 the light radiated is predominantly continuum light with very little light emitted as line or peak radiation (band widths less than 100 Angstrom units). It is also evident from FIGS. 1 to 3 that less than about 30 per cent of the light radiated has wavelengths shorter than 4,000 Angstroms and that at least about 70 per cent of the radiated light has wavelengths longer than 4,000 Angstrom units.

This form of light radiation is derived from an artificial source that generates non-ionizing high intensity predominantly continuum light radiation with a source intensity of at least about 350 watts per square centimeter steradian when integrated throughout the entire spectral range of said continuum light radiation, as abbreviated by the term: watts $cm^{-2}$ $sr^{-1}$; said non-ionizing high intensity predominantly continuum artificial light radiation has at least about 70 per cent of the light radiated at a wavelength longer than 4,000 Angstroms and a positive amount less than about 30 per cent of the light radiated having a wavelength shorter than 4,000 Angstroms, generally at least about 80 per cent of the light radiated has a wavelength longer than 4,000 Angstroms and a positive amount up to about 20 per cent of the light radiated has a wavelength shorter than 4,000 Angstroms, and it has a source intensity that can vary from about 350 watts (about 1,000 kilowatts per square foot of source projected area) to about 5,000 watts (about 15,000 kilowatts per square foot of source projected area) or more per square centimeter steradian when integrated throughout the entire spectral range. A convenient source of non-ionizing high intensity predominantly continuum light radiation is a swirl-flow plasma arc light radiation apparatus. The equipment for generating non-ionizing high intensity predominantly continuum light radiation by this means is known and available with many different forms thereof described in the literature.

While any artificial source of generating non-ionizing light radiation can be used, as previously indicated, the swirl-flow plasma arc radiation apparatus is most convenient. Hence, this source will be used in this application as illustrative of a means for obtaining the non-ionizing high intensity predominantly continuum light radiation. Any apparatus that operates according to the known principles of the swirl-flow plasma arc radiation source can be used to produce the non-ionizing high intensity predominantly continuum light radiation useful in the processes of this invention. These apparatuses are often known by other terms but those skilled in this art recognize that they emit non-ionizing high intensity predominantly continuum light radiation. The source of radiation in a 50 kilowatt swirl-flow plasma arc radiation source is an arc that is only about four inches long and that is enclosed in a quartz envelope or lamp about 1.5 inches in diameter. This lamp or quartz envelope can be readily removed and refurbished and has an acceptable long lifetime. Further, a swirl-flow plasma arc radiation apparatus having a 250-kilowatt rating would be only about two or three times as large as a 50-kilowatt source. Another advantage in the use of such equipment is the absence of a need for expensive radiation shielding. Precautions required for the artificial light sources include those needed to protect one's eyes from the intense light emitted and also to protect oneself from the ultraviolet light present to prevent inadvertent eye damage or sunburn effect on the body.

As is known, non-ionizing high intensity predominantly continuum light radiation from a swirl-flow plasma arc radiation source is emitted from an arc generated between a pair of electrodes that are lined up axially and encased in a quartz cylinder. In an embodiment a pair of concentric quartz cylinders between which cooling water or gas flows is used. A rare gas, such as argon, krypton, neon or xenon, introduced into the inner cylinder tangentially through inlets located at one end of the inner cylinder, creates a swirling flow or vortex which restricts the arc to a small diameter. An electrical potential applied across the electrodes causes a high density current to flow through the gas to generate a plasma composed of electrons, positively charged ions and neutral atoms. A plasma generated in the above gases produces non-ionizing high intensity predominantly continuum light radiation with diffuse maxima in the region of from about 3,500 to about 6,000 Angstroms. The radiation source can also be used with reflectors or refractive optical systems to direct the non-ionizing high intensity predominantly continuum light radiation emanating from the arc to a particular point or direction or geometrical area.

Figure 3:
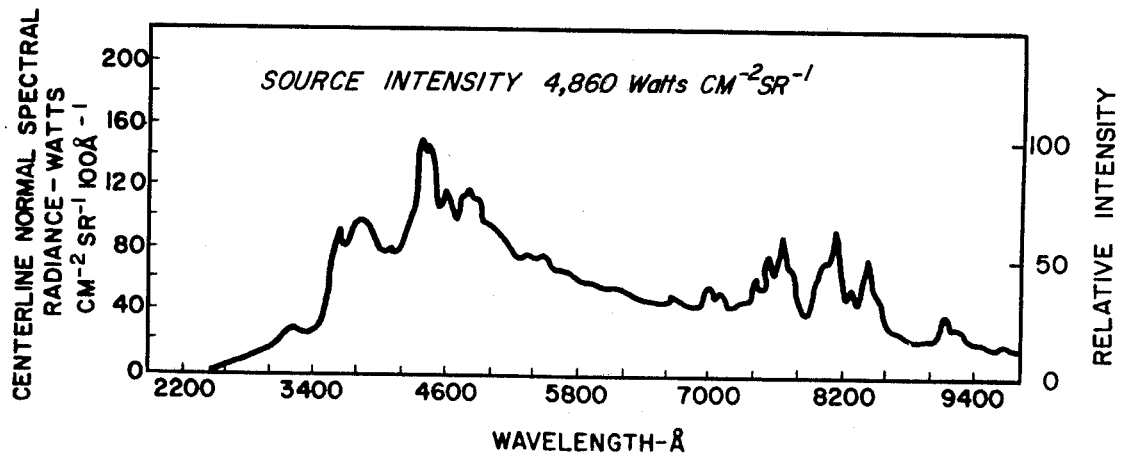
Figure 2:
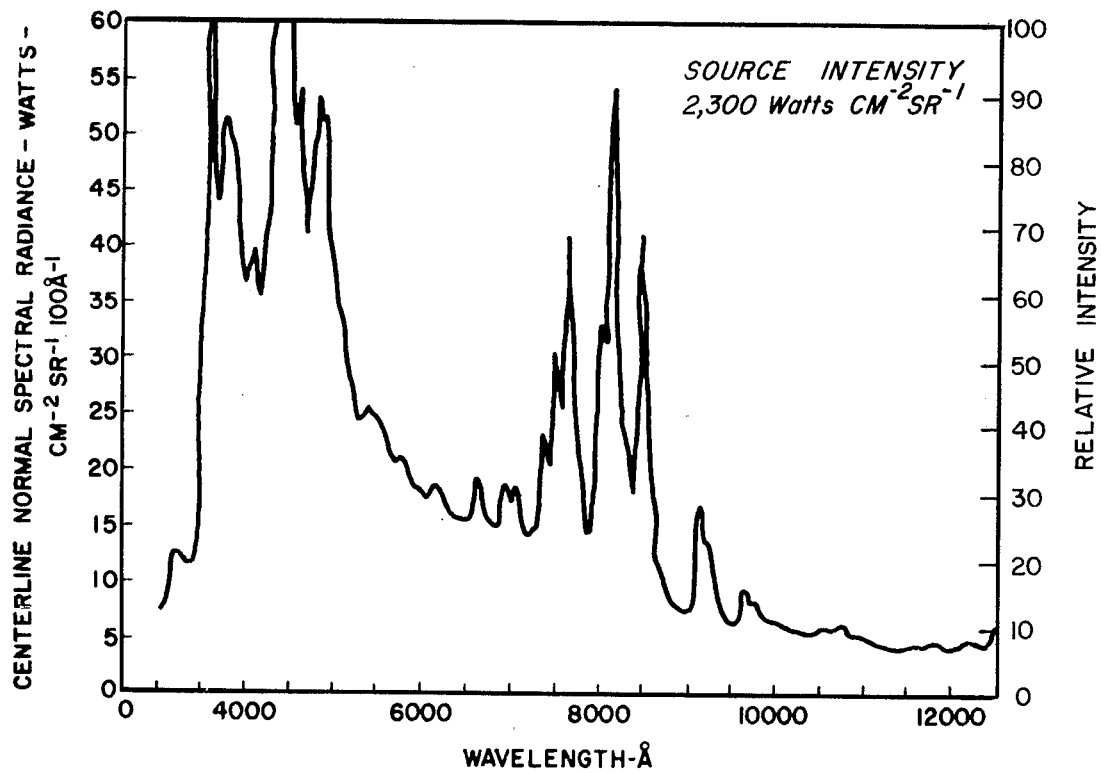

The non-ionizing high intensity predominantly continuum light radiation generated by a plasma arc is a continuum rather than a peak or line radiation. As can be seen from the spectra of FIGS. 1 to 3 there is a continuum of radiation throughout the entire spectral range shown. This type of continuum radiation in the ultraviolet range has not heretofore been obtainable from the conventional commercial mercury arcs or lamps generally available for generating ultraviolet light. The previously known means for generating ultraviolet light produced light that shows a line or peak spectrum in the ultraviolet range, as exemplified by FIG. 4; it is not a continuum spectrum in the ultraviolet range. In a line spectrum the major portion of useable ultraviolet light is that portion at which the line or band in the spectrum forms a peak; in order to obtain maximum use of such energy the material or composition that is to be treated with ultraviolet radiation must be capable of absorbing at that particular wavelength range at which the peak appears. In the event the material or composition does not have the ability to absorb at that particular wavelength range there is little or no absorption or reaction. Thus, in the event the material or composition to be treated absorbs at a particular wavelength range in one of the valleys of the spectral curve there will be little or no reaction since there is little or no ultraviolet energy to adequately excite the system. With a non-ionizing intensity predominantly continuum radiation, as is shown by FIGS. 1 to 3, there is a high intensity predominantly continuum radiation of ultraviolet energy across the entire ultraviolet wavelength range of the spectrum shown and there is generally sufficient ultraviolet energy generated at all useful ultraviolet wavelengths to enable one to carry out reactions responsive to ultraviolet radiation without the problem of selecting compounds that will absorb at peak wavelength bands only. With the non-ionizing high intensity predominantly continuum radiation one does not have the problem of being unable to react materials or compositions that absorb in the valley areas only since for all intents and purposes such valleys do not exist in non-ionizing high intensity predominantly continuum radiation, the high intensity radiated light energy is essentially a continuum, it is not in peak bands.

FIG. 1 is the light radiation curve from an 18 kilowatt argon swirl-flow plasma arc radiation source. The measured source intensity of the light was 360 watts per square centimeter steradian; about 8 per cent of the light had a wavelength shorter than 4,000 Angstrom units and about 92 per cent of the light had a wavelength longer than 4,000 Angstrom units.

FIG. 2 is the light radiation from a 60 kilowatt argon swirl-flow plasma arc radiation source. The measured source intensity was about 2,300 watts per square centimeter steradian; about 10 per cent of the light had a wavelength shorter than 4,000 Angstrom units and about 90 per cent of the light had a wavelength longer than 4,000 Angstrom units.

FIG. 3 is the light radiation from a 71 kilowatt argon swirl-flow plasma arc radiation source. The measured source intensity was about 4,860 watts per square centimeter steradian; about 12 per cent of the liglht had a wavelength shorter than 4,000 Angstrom units and about 88 per cent of the light had a wavelength longer than 4,000 Angstrom units.

Figure 4:
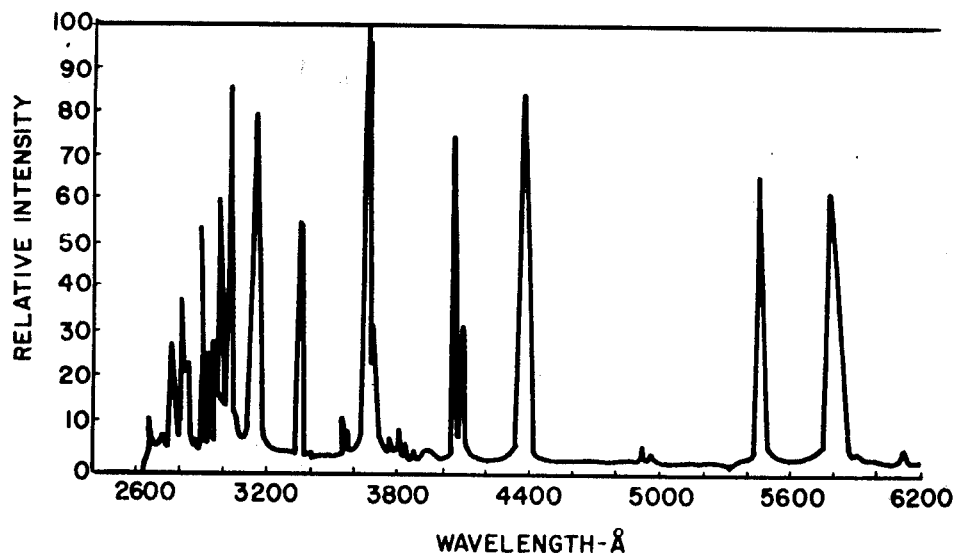

Non-ionizing high intensity predominantly continuum light radiation as shown by FIGS. 1 to 3 is to be distinguished from the low intensity ultravilet radiation generated by commercially available low, medium and high pressure mercury arc ultraviolet lamps. These mercury arc lamps produce light emission which is primarily line or peak rather than continuum light. FIG. 4 is a typical curve for the light radiation from mercury arc lamp. As shown in FIG. 4, a major part of the light appears in bands or peaks narrower than 100 Angstrom units, and much less than 70 per cent is emitted at wavelengths above 4,000 Angstrom units. Such line or peak ultraviolet light radiation is also suitable in the processes of this invention.

The exposure time for this first step of the process will vary with the particular radiation source being employed, the coating composition, the distance of the coating from the radiation source and other physical variables, as is known to those skilled in the art. Generally, exposure of from 0.1 second to several minutes will suffice when this initial radiation step of the process is being carried out using a non-ionizing light radiation source. When using an ionizing radiation source, such as a Van de Graaff, the exposure time is such as to impart a dose of from about 0.05 to about 30 megarads, preferably from about 0.1 to 10 megarads, to the coating composition.

The distance of the coated article from the radiation source can vary from about 3 inches to about 10 feet and is dependent upon the particular system being cured and the particular radiation source being used. One can, if desired, blanket the surface of the coating with an inert gas such as nitrogen, argon, carbon dioxide, etc.

STEP 2

The second step of the process is the thermal curing of the partially cured coating after it has undergone the initial radiation. This entails the passage of the coated object containing the semi-polymerized coating through a heating zone for the thermal cure. The heating zone may be a gas-fired oven and operate by convection currents, but others may be employed with equal effectiveness, such as, microwave, induction coil, infrared and open flame heating ovens. As indicated above, thermal energy may be applied by heat radiation, convection or conduction. Second stage curing is thermal in nature and requires temperatures in the range of 50° to 250°C., or higher. So-called forced-air curing, often used for coatings on wood and cellulosic substrates, is normally operated in the range of 70°–100°C. True baking ovens, often employed to cure metal coatings, function between 150°–200°C. Residence time varies widely depending upon the coating, coated object, and properties sought, ranging from as little as 5 seconds to as much as 30 minutes. Heating cycles on coil lines may range from 5–20 seconds, whereas the thermal setting of appliance enamels may range from 20–30 minutes or more. The thermal curing may be carried out under an inert atmosphere.

It is understood, of course, that the pretreatment and/or priming of metal substrates and filling and/or priming of wood substrates may precede the coating application step and, thus, both curing stages.

THE COATING COMPOSITIONS

The coating compositions that are useful in this process are those that contain (1) a reactive thermoset crosslinker that is thermally cured, and (2) a reactive solvent that responds to both radiation curing and thermal curing. The compositions can also contain (3) reactive components which are radiation sensitive or radiation curable reactive solvents. Part or all of the required reactive sites can be combined in a single molecule or resin type.

The term "reactive thermoset crosslinker" shall mean a compound or site that will undergo thermal curing or crosslinking. The term "reactive solvent" shall mean a compound that responds to both radiation curing and thermal curing. The term "reactive component" shall mean a compound that will undergo radiation curing or crosslinking.

The coating composition contains from about 0.1 to 50 weight per cent, preferably from 10 to 30 weight per cent of (1) the reactive thermoset crosslinker; from 0.1 to 50 weight per cent preferably from 15 to 25 weight per cent of (2) the reactive solvent sensitive to both thermal and radiation crosslinking, with the balance of the composition comprising (3) the radiation sensitive reactive component. The percentages are weight per cent based on the final coating composition.

1. The reactive thermoset crosslinkers can be polyfunctional epoxides having at least two oxirane units or their polyoxirane-containing low molecular weight polymers, or urea/formaldehyde resins, or melamine/formaldehyde resins. These reactive thermoset crosslinkers are well known materials and their function in the coating composition is to thermally crosslink the partially cured coating that has been obtained after the coating has been exposed to the ionizing or non-ionizing radiation in the initial step of the process; it is believed that this cross linking occurs via ionic interaction with the pre-polymerized reactive solvent and/or radiation sensitive reactive component. Illustrative of suitable reactive thermoset crosslinkers one can mention the epoxidized soya, tall and linseed oils, the diglycidyl ether of methylene-4,4-bisphenol, the diglycidyl ether of 2,2-isopropylidene-4,4'-bisphenol, N,N'-dimethylol urea, N,N'-dibutoxymethyl-urea, N,N,N',N',N'',N''-hexamethylolmelamine, N,N,N',N',N'',N''-hexamethoxymethylmelamine, N,N,N',N',N'',N''-hexabutoxymethylmelamine, and the like. Other suitable reactive thermoset crosslinkers include the diepoxides such as 3,4-epoxy-6-methylcyclohexylmethyl-3,4-epoxy-6-methylcyclohexanecarboxylate, bis-(2,3-epoxy-2-ethylhexyl) ether, vinylcyclohexane dioxide, dicyclopentadiene dioxide, diglycidyl ether, bis(3,4-epoxy-6-methylcyclohexylmethyl)adipate, tricyclopentadiene dioxide, and similar diepoxide compounds; triepoxides such as 1,1,1-trimethylolpropane tris-(3,4-epoxy cyclohexanecarboxylate), 1,2,3-propanetriol tris-(3,4-epoxycyclohexanecarboxylate), tris-(2-methyl glycidyl)pentaerythritol, and similar triepoxide compounds. The oligomers of the above, or related, materials, such as the difunctional product obtained by the reaction of two moles of a diepoxide such as vinylcyclohexene dioxide with one mole of an anhydride such as phthalic anhydride; similar (but tetrafunctional) oligomeric products prepared by the reaction of two moles of a triepoxide with one mole of an anhydride; mixed products, i.e., using one mole of diepoxide, one mole of triepoxide and one mole of anhydride to give a product with three oxirane functional groups; as well as the oligomers prepared in the same manner except that extending is done with a diamine instead of an anhydride. Copolymers of glycidyl acrylate (or other compound containing oxirane and vinyl unsaturation) with one or several vinyl monomers. Here the rates of oxirane-containing monomers(s) to other vinyl monomers can be adjusted to give the desired epoxide functionality. The etherified melamine-formaldehyde resins, urea-formaldehyde resins and triazine (other than melamine) resins having any of the different types of lower ether groups, e.g. ethoxy, butoxy, etc. or degree of etherification could be used.

2. The reactive solvents sensitive to both thermal and radiation crosslinking or curing are those which contain both (a) a vinyl polymerizable double bond which is sensitive to radiation polymerization and (b) a functional group which is sensitive to and reacts during the thermal crosslinking step. These compounds are the acrylates and methacrylates of monofunctional and polyfunctional alcohols and the acrylamides and methacrylamides of monofunctional and polyfunctional amines. These can be represented by the structures

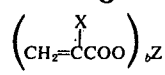

and

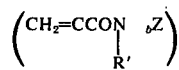

wherein X is hydrogen or methyl, $b$ has a value of 1 to 10, preferably 1 to 4, and when $b$ is one Z is —H, —$C_nH_{2n}$OH,

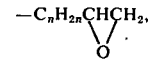

or —$C_nH_{2n}$NHR'; when $b$ is greater than one the Z group is polyvalent and is a hydroxyl-, carboxyl-, amino- or oxirane containing group; R' is hydrogen or alkyl having from 1 to 8 carbon atoms; and $n$ has a value from 1 to 10; and wherein the oxirane group in the radical shown above can be either in the chain or at the terminus of the chain. Illustrative of compounds wherein b has a value of 1 one can mention acrylic acid, methacrylic acid, glycidyl acrylate, glycidyl methacrylate, 2-hydroxyethyl acrylate, 2-hydroxyethyl methacrylate, 2-hydroxypropyl acrylate, 2-hydroxypropyl methacrylate, 2-(N-ethylamino)ethyl acrylate, pentaerithritol monoacrylate, trimethylolpropane monoacrylate, and the like. As indicated above, the Z group can be polyvalent (when $b$ is greater than one) and contains one of the functional moieties specifically enumerated. This Z group is the residue of a polyfunctional organic compound or polymer after it has been acrylated or methacrylated and which still contains therein a functional hydroxyl, carboxyl, amino or oxirane moiety in addition to the acrylyl or methacrylyl group. Illustrative of compounds wherein $b$ is greater than 1, one can mention pentaerythritol diacrylate or triacrylate, trimethylolpropane diacrylate, glycerine diacrylate, glycerine dimethylacrylate; acrylated epoxides such as acrylated fatty acid oil epoxides (acrylated soyabean oil epoxide, acrylated linseed oil epoxide), the product of the reaction of two moles of acrylic acid with one mole of vinylcyclohexene dioxide; urethane oligomers containing both an —OH group and a $CH_2$=C< group, such as the product of the reaction of one mole of poly(epsilon-caprolactone) having an average molecular weight of about 540 (trimethylol propane started) with 3 moles of tolyene diisocyanate, 1.5 moles of propylene glycol and 1.5 moles of 2-hydroxyethyl acrylate; acrylated or methacrylated polyesters such as the products of acrylic acid or methacrylic acid reacted with a hydroxyl terminated polyester in a ratio such that less than 90 per cent of the terminal hydroxyl groups have been esterified.

3. The radiation sensitive reactive component which is primarily responsive to radiation curing can be represented by the formulas:

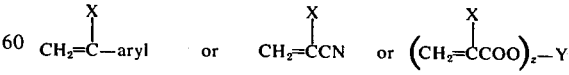

wherein X is hydrogen or methyl; aryl is phenyl or a substituted phenyl; Y is the monovalent radical, cycloalkyl of 5 to 12 carbons, cycloalkenyl of 5 to 12 carbons, —$C_mH_{2m}$H, —$C_mH_{2m}$CN, —$C_mH_{2m}$Cl, $-C_mH_{2m}NR_2''$, $-C_mH_{2m}COONR_2''$, $-C_mH_{2m}COOCH_2OCCH_3$, $-(C_pH_{2p}O)_rC_pH_{2p}H$, or the polyvalent radical, $-C_qH_{2q}-$, $-(C_pH_{2p}O)_xC_pH_{2p}-$, $-(C_yH_{2y}COO)_xC_yH_{2y}-$, $-C_qH_{2q-1}-$, or $-C_qH_{2q-2}-$ wherein R'' is hydrogen or alkyl of 1–5 carbon atoms; m has a value of 1 to 10; r has a value of 0 to 4; p has a value of 2 to 4; q has a value of 2 to 8; x has a value of 1 to 5; y has a value of 2 to 5; z is 1 to 4 and when z is one, the group Y is monovalent and when z is 2 to 4 the group Y is polyvalent. Illustrative of such compounds one can mention styrene, alpha-methylstyrene, chlorostyrene, p-methylstyrene, methyl methacrylate, butyl methacrylate, n-octyl methacrylate, ethyl acrylate, butyl acrylate, 2-ethylhexyl acrylate, isodecyl acrylate, lauryl acrylate, cyclohexyl acrylate, bicyclo[2.2.1]heptyl methacrylate, tricyclo[5.2.1.0$^{2,6}$]dec-3-(or 4)-en-8(or 9)-yl acrylate, 2-ethoxyethyl acrylate, 2-butoxyethyl acrylate, 2-cyanoethyl acrylate, 2-(N,N-diethylamino)ethyl acrylate, acrylonitrile, methacrylonitrile, ethylene glycol dimethacrylate, 1,2-propylene glycol diacrylate, 1,4-butanediol diacrylate, neopentyl glycol diacrylate, 1,3-glycerol dimethyacrylate, trimethylolpropane triacrylate, pentaerythritol tetramethacrylate, pentaerythritol triacrylate, and the like. Any compound having an ethylenically unsaturated site that is capable of radiation curing or crosslinking can be used. Hence, many of these previously listed as reactive thermoset crosslinkers or reactive solvent could be included in this group. The compounds suitable can contain oxirane, hydroxyl, carboxyl, halo, nitro, sulfonic, etc. groups in addition to the unsaturation.

A free radical initiator can be present in the coating composition at a concentration of from about 0.01 weight per cent to about 20 weight per cent. As free radical initiators, one can mention the dialkyl peroxides (cyclic or acyclic), diaryl peroxides, hydroperoxides, peracids, peresters, azo compounds, and other known free radical sources. Illustrative thereof are di-tert-butyl peroxide, benzoyl peroxide, 2,4-dichlorobenzoyl peroxide, t-butylhydroperoxide, 2,5-dimethyl-2,5-bis(hydroperoxy)-hexane, peracetic acid, perbenzoic acid, t-butyl peroxypivalate, t-butyl peracetic, azo-bis-isobutyronitrile, and the like. Mixtures thereof can be used. The amount of free radical initiator can vary from about 0.01 to about 20 weight per cent of the polymer. A preferred amount is from about 0.1 to about 5 weight per cent, and most preferred is from about 0.5 to about 2 weight per cent. In some instances, a synergistic effect is noted by the use of mixtures thereof with or without certain photosensitizers.

When a source of non-ionizing radiation is used in the first step of this invention a photosensitizer is preferably added to enhance the reaction. As is obvious, one can use one or more photosensitizers and they can be used in conjunction with one or more free radical initiators. The amount of photosensitizer can be varied from about 0.01 to about 20 weight per cent, preferably from about 0.1 to about 10 weight per cent, and more preferably from about 0.5 to about 5 weight per cent. Illustrative of suitable photosensitizers one can mention acetophenone, propiophenone, benzophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, 3-methoxyxanthone, 3-iodo-7-methoxyxanthone, and the like.

The coating composition can also contain small amounts of other crosslinkable polymers. Such polymers can be present at concentrations up to about 20 weight per cent. Illustrative of useful crosslinkable polymers one can include the olefin polymers and copolymers such as polyethylene, polypropylene, polyisobutene, polybutene, poly(ethylene/propylene), poly(ethylene/butene), poly(ethylene/butadiene), poly(ethylene/norbornadiene), poly(ethylene/propylene/norbornadiene), poly(ethylene/propylene/5-methylene-bicyclo[2.2.1]hept-2-ene), poly(ethylene/propylene/5-ethylidene-bicyclo[2.2.1]hept-2-ene), poly(ethylene/vinyl acetate), poly(ethylene/vinyl chloride), poly(ethylene/ethyl acrylate), poly(ethylene/acrylonitrile) poly(ethylene/acrylic acid), poly(ethylene/styrene), poly(ethylene/vinyl ethyl ether), poly(ethylene/vinyl methyl ketone), polybutadiene, polyisoprene, polychloroprene, polycyclopentadiene, poly-1,5-hexadiene, poly(butadiene/isoprene), poly(butadiene/vinyl chloride), poly(butadiene/dimethyl butadiene), poly(butadiene/chloroprene), poly(isoprene/isobutylene), poly(butadiene/isobutylene), poly(butadiene/styrene), poly(butadiene/acrylonitrile), poly(butadiene/styrene/acrylonitrile), poly(butadiene/methyl methacrylate), poly(butadiene/butyl acrylate), poly(butadiene/vinyl chloride), poly(isoprene/styrene), poly(isoprene/2-vinyl pyridine), and the like. The olefin polymers are well known and any such polymer can be used. Also suitable are the vinyl and vinylidene polymers such as poly(vinyl chloride), poly(vinyl bromide), poly(vinylidene chloride), poly(vinyl acetate), poly(vinyl methyl ether), poly(vinyl butyl ether), poly(vinyl methyl ketone), poly(vinyl alcohol), poly(allyl alcohol), polyindene, poly(vinylpyridine), poly(vinylpyrrolidone), poly(vinyl butyral), poly(vinyl chloride), poly(vinyl sulfonic acid), polystyrene, poly($\alpha$-methylstyrene), poly(4-chlorostyrene), poly(4-vinyl biphenyl), poly(9-vinyl-anthracene), poly(N-vinyl-carbazole), poly(N-vinyl-1,2,4-triazole), and the like. Further suitable polymers are the acrylic polymers such as poly(acrylic acid), poly(methyl acrylate), poly(ethyl acrylate), polyacrylonitrile, polyacrylamide, polyacrolein, poly(methacrylic acid), poly(methyl methacrylate), poly(ethyl methacrylate), polymethacrylonitrile, poly(N,N-dimethyl acrylamide), poly(methacrylamide), poly(9-acrylylcarbazole), poly($\alpha$-methacrolein), poly(diacrylalmethane), poly(acrylic anhydride), poly(methacrylic anhydride), and the like. In addition, the polyesters and polyamides such as polycaprolactone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like, are useful. The polyethers such as poly(glutardialdehyde), polyethylene oxide, polypropylene oxide poly(tetrahydrofuran), polycyclohexene oxide, copolymers of ethylene oxide and propylene oxide with starters containing reactive hydrogen atoms such as the mixed copolymer using ethylene glycol, glycerol, sucrose, etc., as the starter. Also suitable are the known polyureas and polyurethanes as described in *Polyurethanes: Chemistry and*

*Technology*, Volumes I and II, Saunders and Frisch, published by Interscience Publishers, as well as the natural and modified natural polymers such as gutta percha, cellulose, methyl cellulose, starch, silk, wool, and the like, and the siloxane polymers and copolymers. The polysulfides and polysulfones such as poly(thiocarboxyl fluoride), poly(ethylene dichloride-co-sodium tetrasulfide), poly(ethylene sulfide), poly(ethylene sulfone), poly(styrene sulfone), poly(1-pentyne sulfone), poly(butadiene sulfone), poly(isoprene sulfone), and the like. The formaldehyde polymers such as polyformaldehyde, formaldehyde resins such as phenolformaldehyde, melamine-formaldehyde, urea-formaldehyde, aniline-formaldehyde and acetone-formaldehyde, and the like. The heterocyclic polymers such as poly(benzimidazoles), poly(alkylene-5,5'-dibenzimidazoles), poly(arylene-5,5'-benzimidazoles), poly(pyromellitimides), poly(benzoxazoles), poly(oxadiazoles), poly(dithiazoles), poly(benzothiazoles), poly(piperazines), poly(quinoxalines), and the like.

One can also include in the coating composition a minor amount up to about 30 weight per cent of a polymerizable ethylenically unsaturated monomer containing at least one polymerizable ethylenically unsaturated group of the structure >C—C< in the coating composition. Such monomers can be aliphatic or aromatic. Illustrative thereof one can mention the olefinic hydrocarbons containing up to about 18 carbon atoms such as ethylene, propylene, butylenes, pentenes, hexenes, dodecene, heptenes, octenes, styrene, 4-methylstyrene, alpha methylstyrene, cyclopentadiene, dicyclopentadiene, butadiene, hexadiene, bicyclo[2.2.1]hept-2-ene, bicyclo[2.2.1]hept-2,5-diene, methylbicyclo[2.2.1] hept-2-ene, cyclohexene, 4-methyl-1-pentene, 5-methyl-1-hexene and the like; the vinyl halides such as vinyl chloride, vinylidene chloride, and the like; the vinyl esters such as vinyl acetate, vinyl butyrate, vinyl benzoate, and the like; the vinyl ketones such as isopropenyl methyl ketone, vinyl phenyl ketone, vinyl methyl ketone, alphachlorovinyl methyl ketone, and the like; the vinyl thioethers such as vinyl ethyl sulfide, vinyl p-tolyl sulfide, divinyl sulfide, and the like. Other monomers that can be used are divinyl sulfone, vinyl ethyl sulfone, vinyl ethyl sulfoxide, vinyl sulfonic acid, sodium vinyl sulfonate, vinyl fulsonamide, vinyl pyridine, N-vinyl pyrrolidone, N-vinyl carbazole, and the like. Other suitable vinyl monomers are readily apparent to the skilled polymer chemist; this listing is illustrative only and not all-inclusive. The preferred monomers include styrene and its derivative and the acrylyl and methacrylyl compounds and derivatives thereof. One can also incorporate, if desired, minor amounts of reactive crosslinkable oligomers.

The inclusion of pigments, fillers, wetting agents, flatting agents, leveling agents, and other additives typically present in coating formulations is also contemplated. These additives and the concentrations at which they are used are well known to those skilled in the art and do not require further discussion here.

The coating compositions of this invention can be used to prepare coatings for panel board finishing, plywood finishing, automotive coatings, furniture coatings, can coatings, coil coatings and any other applications in which a protective coating is used.

The following examples serve to describe the invention.

EXAMPLE 1

A coating composition was prepared by admixing 30 parts of acrylic acid, 50 parts of 2-ethylhexyl acrylate, 20 parts of bis-glycidyl ether of 2,2-propylidene-4,4'-bisphenol, 0.5 part of triethanolamine and 1 part of benzoin butyl ether. This coating was applied on steel panels using a No. 20 wire-wound rod. The coated panels were cured by the process of this invention and also by conventional processes for comparative purposes as shown below.

Panel A

This coated panel was weighed, then placed in an enclosed box and purged with nitrogen for 15 seconds. The panel still in the $N_2$ atmosphere was then exposed to the non-ionizing high intensity predominantly continuum light radiation emanating from a 50-kilowatt argon swirl-flow plasma arc for 5 seconds at a distance of 2 feet from the arc for the initial radiation cure. Subsequently, the panel was placed in an oven at 210°C. for 30 minutes for the second stage thermal cure. At the end of this period the panel was reweighed and it was found that only 4 per cent of the initially applied coating had volatilized during the two-stage cure. The cured coating had a Sward hardness of 30 and resisted breakthrough by acetone-soaked cotton for greater than 60 minutes.

Panel B

This panel was coated and then given the initial radiation cure by exposure to the non-ionizing high intensity predominantly continuum light radiation in the same manner as was Panel A. However, it was not subsequently oven cured or subjected to the second stage thermal cure. The resulting coating was undercured, still tacky and resisted breakthrough by acetone-soaked cotton for only 60 minutes. Though it was acetone-resistant it was not a commercially acceptable cured coating.

Panel C

This panel was coated and then thermally cured in the oven under the same conditions described in Panel A for the second stage thermal cure only. It was not exposed to the initial non-ionizing high intensity predominantly continuum light radiation cure. It was found that 80 per cent of the initially applied coating composition had volatilized and that the remaining finish had an acetone resistance of less than 5 minutes.

The data shows that curing the coating by initially radiating and then thermally curing by the two stage process of this invention produces a superior coating. A comparison of Panel A with Panel B shows that under the same radiation conditions Panel B was not fully cured; a comparison of Panel A with Panel C shows that under the same thermal curing conditions an intolerable loss of material is experienced when curing is accomplished solely by thermal means.

EXAMPLE 2

A coating composition having the parts by weight indicated was prepared having the following formulation:

| | |
|---|---|
| Acrylic acid | 32.0 |
| 2-Ethylhexyl acrylate | 48.0 |
| 3,4-Epoxycyclohexylmethyl | 20.0 |

-continued 3,4-epoxycyclohexyl carboxylate
n-Butyl ether of benzoin  1.6
p-Toluene sulfonic acid
(20% solution)  0.2

This composition was coated on aluminum panels and initially radiation cured by exposure to the non-ionizing high intensity predominantly continuum light radiation as described in Example 1. It was then given a second stage thermal cure for 10 minutes in a 200°C. oven. The finished coating had the following properties:

Sward Hardness (Glass = 100)  48
Reverse Impact (in-lbs.)  >165
Acetone resistance (rub cycles)  >50
Resistance to breakthrough  >60
by acetone-soaked cotton

EXAMPLE 3

Coating compositions were prepared varying the amount of photosensitizer present in the formulation. The coatings were then applied to birch faced plywood panels with a No. 20 wire wound rod, cured as described below, sanded, recoated, and then cured again under the same curing conditions. In all instances, curing was achieved by prepurging the coated panels with nitrogen for 15 seconds and then subjecting them to the initial radiation cure by exposing them under nitrogen to the non-ionizing high intensity predominantly continuum light radiation emanating from a 50-kilowatt argon swirl-flow plasma arc for 5 seconds at a distance of two feet and then thermally curing in the second stage in a forced air oven at 82°C. for 20 minutes. The compositions and the properties of the coatings after the two-stage cure by the process of this invention are set forth below. The concentrations are parts by weight.

| Runs | 1 | 2 | 3 | 4 | 5 | 6 | 7 | 8 |
|---|---|---|---|---|---|---|---|---|
| 2-Hydroxyethyl acrylate | 25 | 25 | 25 | 25 | 25 | 25 | 25 | 25 |
| Isodecyl acrylate | 50 | 50 | 50 | 50 | 50 | 50 | 50 | 50 |
| Neopentyl glycol diacrylate | 5 | 5 | 5 | 5 | 5 | 5 | 5 | 5 |
| Hexamethoxymethylmelamine | 20 | 20 | 20 | 20 | 20 | 20 | 20 | 20 |
| p-Toluene sulfonic (20% solution) | 1 | 1 | 1 | 1 | 1 | 1 | 1 | 1 |
| n-Butyl ether of benzoin | 3.0 | 2.5 | 2.0 | 1.5 | 1.0 | 0.75 | 0.50 | 0.25 |
| 60° Gloss (Gardner) | 97 | 75 | 85 | 82 | 87 | 92 | 87 | 81 |
| Sward Hardness (Glass = 100) | 10 | 12 | 12 | 6 | 8 | 10 | 6 | 12 |
| Taber wear factor (100 cycles) | 47.2 | 70.6 | 68.7 | 42.1 | 38.5 | 56.2 | 53.9 | 31.9 |
| Resistance to: | | | | | | | | |
| Nail polish remover (60 sec.) | 10 | 10 | 10 | 10 | 10 | 10 | 10 | 10 |
| black ink | 5 | 8 | 5 | 5 | 5 | 8 | 7 | 6 |
| 20% caustic (4 hrs.) | 10 | 10 | 10 | 10 | 10 | 10 | 10 | 10 |
| mercurochrome* | 10 | 10 | 10 | 10 | 10 | 10 | 10 | 10 |
| bleach | 10 | 10 | 10 | 10 | 10 | 10 | 10 | 10 |

*2,7-Disodiumdibromo-4-hydroxymercurifluorescein

EXAMPLE 4

Following the procedure and the two-stage curing process described in Example 3, but varying the amount of para-toluene sulfonic acid, a series of coating compositions was prepared, coated on birch faced plywood panels and cured by the two-step procedure of this invention. The compositions and the physical properties of the coatings produced are set forth below. The data indicates that this formulation requires a concentration of at least one part by weight of p-toluene sulfonic acid (as in Run 3) to produce a coating of satisfactory gloss and Sward hardness. All of the concentrations are expressed as parts by weight.

| Runs | 1 | 2 | 3 | 4 | 5 |
|---|---|---|---|---|---|
| 2-Hydroxyethyl acrylate | 25 | 25 | 25 | 25 | 25 |
| Isodecyl acrylate | 50 | 50 | 50 | 50 | 50 |
| Neopentyl glycol diacrylate | 5 | 5 | 5 | 5 | 5 |
| Hexamethoxymethylmelamine | 20 | 20 | 20 | 20 | 20 |
| p-Toluene sulfonic acid (20% solution) | 2.0 | 1.5 | 1.0 | 0.50 | 0.25 |
| n-Butyl ether of benzoin | 1.0 | 1.0 | 1.0 | 1.0 | 1.0 |
| 60° Gloss (Gardner) | 100 | 100 | 100 | 60 | 22 |
| Sward Hardness (Glass = 100) | 16 | 12 | 8 | 0 | 0 |
| Taber Wear Factor (100 cycles) | 37.0 | 36.5 | 50.7 | 145.1 | 128.6 |
| Resistance to: | | | | | |
| nail polish remover (60 sec.) | 10 | 10 | 10 | 10 | 10 |
| black ink | 6 | 6 | 6 | 5 | 5 |
| 20% caustic (4 hrs.) | 10 | 10 | 10 | 10 | 10 |
| mercurochrome | 10 | 10 | 10 | 10 | 10 |
| bleach | 10 | 10 | 10 | 10 | 10 |

EXAMPLE 5

Following the procedure and two-stage curing process described in Example 3 a series of coating compositions was prepared, applied to the birch faced plywood panels and cured in the manner described in Example 2. The coating formulations and the properties of the cured coatings are tabulated below; the concentrations are expressed in parts by weight.

| Runs | 1 | 2 | 3 | 4 | 5 |
|---|---|---|---|---|---|
| 2-Hydroxyethyl acrylate | 9 | 36 | 40 | 36 | 36 |
| Isodecyl acrylate | 76 | 49 | — | — | — |
| Neopentyl glycol diacrylate | 5 | 5 | 10 | 9 | 9 |
| Hexamethoxymethylmelamine | 10 | 10 | 10 | 18 | — |
| p-Toluene sulfonic acid (20% solution) | 1 | 1 | 1 | 1 | 1 |
| n-Butyl ether of benzoin | 1 | 1 | 2 | 2 | 2 |
| 2-Ethylhexyl acrylate | — | — | 40 | 36 | 36 |
| Cymel 301 | — | — | — | — | 18 |
| 60° Gloss (Gardner) | 54 | 84 | 100 | 100 | 100 |
| Sward Hardness (Glass = 100) | 0 | 6 | 12 | 24 | 15 |
| Taber Wear Factor (100 Cycles) | 117.7 | 88.1 | 6.30 | 5.75 | 8.45 |
| Crosshatch Adhesion (percent) | 100 | 100 | 100 | 100 | 100 |
| Resistance to: | | | | | |
| nail polish remover (60 sec.) | 10 | 10 | 10 | 10 | 10 |
| black ink | 6 | 6 | 8 | 9+ | 8+ |
| 20% caustic          4 hrs. | 10 | 10 | 10 | 10 | 10 |
| mercurochrome | 10 | 10 | 10 | 10 | 10 |
| bleach | 10 | 10 | 10 | 10 | 10 |

EXAMPLE 6

Coating compositions were prepared, coated on aluminum panels and cured by the two-stage curing process as described in Example 2. The compositions and the properties of the final coatings are set forth in the following table; concentrations are expressed as parts by weight.

| Runs | 1 | 2 |
|---|---|---|
| 2-Hydroxyethyl acrylate | 80 | 90 |
| Hexamethoxymethylmelamine | 20 | 10 |
| n-Butyl ether of benzoin | 1.0 | 1.0 |
| p-Toluene sulfonic acid (20% solution) | 1.0 | 1.0 |
| Sward Hardness (Glass = 100) | 58 | 20 |
| Reverse Impact (in-lbs.) | 5 | 100 |
| Acetone resistance (rub cycles) | >50 | >50 |
| Resistance to breakthrough by acetone-soaked cotton, min. | >60 | >60 |

EXAMPLE 7

A coating composition comprised of 36 parts of 2-hydroxyethyl acrylate, 36 parts of 2-ethylhexyl acrylate, 8 parts of hexamethoxymethylmelamine, 0.8 part of p-toluenesulfonic acid, 40 parts of titanium dioxide and 40 parts of zinc oxide was applied to a No. 37 Bonderite steel panel by draw-down with a No. 20 wire-wound rod. The coated panel was initially radiation cured by subjecting it to 4 megarads of high-energy electrons (300 KeV, 25 milliamps) and it was then thermally cured in a 210°C oven for 10 minutes. The coating cured by the two-stage procedure of this invention possessed both excellent adhesion and chemical resistance. It exhibited a Sward hardness of 20, a reverse impact resistance of 25 inch-pounds, resistance to more than 50 acetone rubbing cycles, 100 percent crosshatch adhesion, and excellent resistance to boiling water for 30 minutes.

EXAMPLE 8

Coating compositions were prepared according to the formulations set forth below; concentrations are given in parts by weight.

| Runs | 1 | 2 |
|---|---|---|
| 2-Hydroxyethyl acrylate | 35 | 35 |
| 2-Ethoxyhexyl acrylate | 35 | 35 |
| Neopentyl glycol diacrylate | 10 | 10 |
| Hexamethoxymethylmelamine | 20 | 20 |
| p-Toluene sulfonic acid (20% solution | 1.5 | 1.5 |
| Benzoin n-butyl ether | 2.0 | — |
| Benzophenone | — | 2.0 |

Each solution was drawn down on a No. 37 Bonderite steel panel with a No. 20 wire-wound rod. The panels coated with the formulations were purged with nitrogen as described in Example 1 for 20 seconds and the initially radiation cured by exposure to the ultraviolet light radiation emanating from two side-by-side 550-watt medium-pressure mercury lamps housed in directional reflectors at a distance of 10 inches; Run 1 was irradiated for 75 seconds and Run 2 was irradiated for 7.5 minutes. The coatings that were subjected to this initial radiation cure were then placed in an 82°C oven for 20 minutes and permitted to thermally cure. The finishes produced by this two-stage procedure exhibited the following properties:

| Runs | 1 | 2 |
|---|---|---|
| Thickness (mils | 0.45 | 0.45 |
| Gloss (60° spectral) | 105 | 105 |
| Sward hardness | 52 | 60 |
| Front impact resistance (in-lbs.) | 5 | <5 |
| Taber abrasion (1000 cycles, CS-17 wheels) | 4.4 | 2.7 |
| ⅛-inch cross-hatch Scotch tape adhesion | 0% | 30% |
| Resistance to acetone (rub cycles) | >100 | >100 |
| Stain resistance | | |
| nail polish remover (60 sec.) | 10 | 10 |
| black ink | 7 | 9 |
| 20% aqueous caustic     4 hrs. | 10 | 10 |
| mercurochrome | 10 | 10 |
| bleach | 10 | 10 |

EXAMPLE 9

Coating formulations were prepared having the following compositions:

| Runs | 1 | 2 |
|---|---|---|
| 2-Hydroxyethyl acrylate | 35 | 35 |
| 2-Ethylhexyl acrylate | 35 | 35 |
| Neopentyl glycol diacrylate | 10 | 10 |
| Urea-formaldehyde resin (60% solids in 50/50 n-butanol/xylene) | 33 | 33 |
| p-Toluene sulfonic acid (20% solution) | 1.5 | 1.5 |
| Benzoin n-butyl ether | 2.0 | — |
| Benzophenone | — | 2.0 |

These coatings were then cured by the same two-stage procedure described in Example 8. The finished coatings produced by the two-stage process had the following properties:

| Runs | 1 | 2 |
|---|---|---|
| Thickness (mils) | 0.45 | 0.35 |
| Gloss (60° spectral) | 98 | 96 |
| Sward hardness | 44 | 82 |
| Front impact resistance (in-lbs.) | 5 | <5 |
| Taber abrasion (1000 cycles, CS-17 wheels) | 3.3 | 4.0 |
| ⅛-inch cross-hatch Scotch tape adhesion | 0% | 100% |
| Resistance to acetone (rub cycles) | >100 | >100 |
| Stain resistance | | |
| nail polish remover (60 sec.) | 10 | 10 |
| black ink | 6 | 7 |
| 20% aqueous caustic     4 hrs. | 10 | 5 |
| mercurochrome | 10 | 9 |
| bleach | 10 | 9 |

EXAMPLE 10

Coating compositions were prepared having the following compositions:

| Runs | 1 | 2 |
|---|---|---|
| 2-Hydroxyethyl acrylate | — | 9 |
| EPOA* | 30 | 30 |
| Isodecyl acrylate | 55 | 46 |
| Neopentyl glycol diacrylate | 5 | 5 |
| Hexamethoxymethylmelamine | 10 | 10 |
| p-Toluene sulfonic acid (20% sol'n) | 1 | 1 |
| n-Butyl ether of benzoin | 1 | 1 |

*acrylated epoxidized soyabean oil

These coatings were subjected to the two-stage cure process of this invention under the conditions described in Example 3 with the finished coatings having the following properties:

| Runs | 1 | 2 |
|---|---|---|
| 60° Gloss (Gardner) | 60 | 32 |
| Sward Hardness (Glass = 100) | 0 | 0 |
| Taber Wear Factor (100 cycles) | 152.7 | 142.2 |
| Crosshatch Adhesion (percent) | 100 | 100 |

| Runs | 1 | 2 |
|---|---|---|
| Resistance to: | | |
| nail polish remover (60 sec.) | 10 | 10 |
| black ink | 5 | 5 |
| 20% caustic     4 hrs. | 10 | 10 |
| mercurochrome | 10 | 10 |
| bleach | 10 | 10 |

What is claimed is:

1. A method for coating a substrate which comprises the steps of
   A. applying a fluid coating composition to said substrate, said fluid coating composition comprising
      a. from 0.1 to 50 weight per cent of a thermally curable reactive thermoset crosslinker selected from the group consisting of:
         i. a polyfunctional epoxide having at least two oxirane units,
         ii. the polyoxirane-containing low molecular weight polymers of (i),
         iii. a urea/formaldehyde resin, or
         iiii. a melamine/formaldehyde resin,
      b. from 0.1 to 50 weight per cent of a radiation and thermally curable reactive solvent selected from the group consisting of:
         i. an acrylate or methacrylate of a monofunctional or polyfunctional alcohol, or
         ii. an acrylamide or methacrylamide of a monofunctional or polyfunctional amine, said solvent having both at least one vinyl polymerizable double bond and at least one thermally sensitive hydroxyl, carboxyl, amino or oxirane group, and
      c. the balance thereof being a radiation sensitive reactive component of the formula

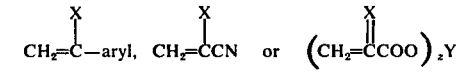

wherein X is hydrogen or methyl; aryl is phenyl or substituted phenyl; z has a value of 1 to 4; when z is 1, Y is monovalent cycloalkyl of 5 to 12 carbon atoms, cycloalkenyl of 5 to 12 carbon atoms, $-C_mH_{2m}H$, $-C_mH_{2m}CN$, $-C_mH_{2m}Cl$, $-C_mH_{2m}NR_2''$, $-C_mH_{2m}COONR_2''$, $-C_mH_{2m}COOCH_2OCH_2CH_3$, or $-(C_pH_{2p}O)_rC_pH_{2p}H$, when z is greater than 1, Y is $-C_qH_{2q}-$, $-(C_pH_{2p}O)_xC_pH_{2p}-$, $-(C_yH_{2y}COO)_xC_yH_{2y}-$, $-C_qH_{2q}{}^-{}_1-$, or $-C_qH_{2q}{}^-{}_2-$; R'' is hydrogen or alkyl of 1 to 5 carbon atoms; m has a value of 1 to 10; r has a value of 0 to 4; p has a value of 2 to 4; q has a value of 2 to 8; x has a value of 1 to 5; and y has a value of 2 to 5;
   B. subjecting said applied coating composition to ionizing or non-ionizing irradiation to initiate free-radical polymerization of components (b) and (c) and thereafter
   C. subjecting the coated article of step (B) to elevated temperature of from 50° to 250°C. to thermally cure components (a) and (b) and obtain a solid, dry coating on said substrate.

2. A method for coating a substrate as claimed in claim 1 wherein said coating composition comprises:
   a. from 0.1 to 50 weight per cent of a thermally curable reactive thermoset crosslinker selected from the group consisting of:

i. a polyfunctional epoxide having at least two oxirane units,
ii. the polyoxirane-containing low molecular weight polymers of (i),
iii. a urea/formaldehyde resin, or
iiii. a melamine/formaldehyde resin,
b. from 0.1 to 50 weight per cent of a radiation and thermally curable reactive solvent selected from the group consisting of:
i. an acrylate or methacrylate of a monofunctional or polyfunctional alcohol, or
ii. acrylamide or methacrylamide of a monofunctional or polyfunctional amine, said solvent having both at least one vinyl polymerizable double bond and at least one thermally sensitive hydroxyl, carboxyl, amino or oxirane group.

3. A method for coating a substrate as claimed in claim 2 wherein said coating composition additionally contains (c) a radiation sensitive reactive component of the formula:

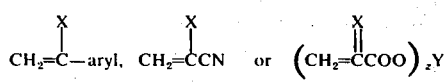

wherein X is hydrogen or methyl; aryl is phenyl or substituted phenyl; $z$ has a value of 1 to 4; when $z$ is 1, Y is monovalent cycloalkyl of 5 to 12 carbon atoms, cycloalkenyl of 5 to 12 carbon atoms, $-C_mH_{2m}H$, $-C_mH_{2m}CN$, $-C_mH_{2m}Cl$, $-C_mH_{2m}NR_2''$, $-C_mH_{2m}COONR_2''$, $-C_mH_{2m}COOCH_2OCH_2CH_3$, or $-(C_pH_{2p}O)_rC_pH_{2p}H$, when $z$ is greater than 1, Y is $-C_qH_{2q}-$, $-(C_pH_{2p}O)_xC_pH_{2p}-$, $-(C_yH_{2y}COO)_xC_yH_{2y}-$, $-C_qH_{2q^-1}-$, or $-C_qH_{2q^-2}-$; R'' is hydrogen or alkyl of 1 to 5 carbon atoms; $m$ has a value of 1 to 10; $r$ has a value of 0 to 4; $p$ has a value of 2 to 4; $q$ has a value of 2 to 8; $x$ has a value of 1 to 5; and $y$ has a value of 2 to 5.

4. A method for coating a substrate as claimed in claim 1 wherein the irradiation in step (B) is non-ionizing high intensity predominantly continuum light radiation, said non-ionizing high intensity predominantly continuum light radiation having a source intensity of at least 350 watts per square centimeter steradian when integrated throughout the entire spectral range of said continuum light radiation with a positive amount up to 30 per cent of the light radiated having wavelengths shorter than 4,000 Angstroms and at least 70 per cent but less than all of the light radiated having wavelengths longer than 4,000 Angstroms.

5. A method for coating a substrate as claimed in claim 1 wherein the irradiation in step (B) is non-ionizing radiation of from 2500 Angstroms to 4500 Angstroms wavelength range.

6. A method for coating a substrate as claimed in claim 1 wherein the radiation in step (B) is ionizing radiation.

7. A method as claimed in claim 1 wherein component (a) is present at a concentration of from 10 to 30 weight per cent and component (b) is present at a concentration of from 15 to 25 weight per cent.

8. A method for coating a substrate as claimed in claim 1 wherein the thermal curing is carried out under an inert atmosphere.

9. A method as claimed in claim 1 wherein step (B) is carried out under an inert atmosphere.

* * * * *

UNITED STATES PATENT OFFICE
CERTIFICATE OF CORRECTION

Patent No. 3,935,330　　　　　　　Dated January 27, 1976

Inventor(s) O. W. Smith et al

It is certified that error appears in the above-identified patent and that said Letters Patent are hereby corrected as shown below:

Column 8, lines 5 to 7, the formula should read:

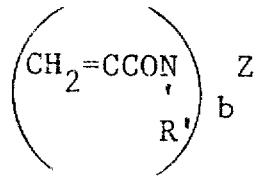

Signed and Sealed this

*twenty-seventh* Day of *April 1976*

[SEAL]

Attest:

RUTH C. MASON
*Attesting Officer*

C. MARSHALL DANN
*Commissioner of Patents and Trademarks*